Feb. 20, 1934.  J. A. MAURER, JR  1,947,567
OPTICAL SYSTEM
Filed April 6, 1931  2 Sheets-Sheet 1

INVENTOR
J. A. MAURER, JR.
BY
ATTORNEY

Feb. 20, 1934.   J. A. MAURER, JR   1,947,567
OPTICAL SYSTEM
Filed April 6, 1931   2 Sheets-Sheet 2

INVENTOR
J. A. MAURER, JR.
BY
ATTORNEY

Patented Feb. 20, 1934

1,947,567

UNITED STATES PATENT OFFICE 1,947,567

OPTICAL SYSTEM

John A. Maurer, Jr., New York, N. Y., assignor to Radio Corporation of America, a corporation of Delaware Application April 6, 1931. Serial No. 528,098

3 Claims. (Cl. 88—24)

This invention relates to optical systems, and more particularly to such optical systems as are used in phonographic apparatus, such as that of the photoelectric type, for producing a narrow linear image of either a primary or a secondary light source upon an image area such, for example, as the sound-track of a sound and picture film.

The present application pertains more particularly to such systems in which the dimensions of the final image are dependent upon the characteristics of the system rather than on the dimensions of the light-source or of a slit serving as a secondary source, and accordingly is related to my applications, Docket Nos. 5317, 5318, 5319, and 5321, filed concurrently herewith and pertaining to collateral inventions of the same general kind. The present application, however, is characterized by the employment of a primary group of lenses having a phero-cylindrical power and arranged to form a horizontal virtual image of the light-source reduced in its vertical dimension between such group of lenses and the light source.

One object of this invention is to produce such an optical system of reasonably high light efficiency and at the same time capable of producing an image of the necessary lateral attenuation.

Another object of this invention is to produce such a system which is capable of reasonable facility of manufacture.

Another object of this invention is to produce such a system which is capable of being manufactured at a reasonable cost under modern production methods.

Another object of this invention is to produce such a system which is adapted to reasonable facility and accuracy in installation.

Another object of this invention is to produce such a system which is adapted to or capable of using present commercially available lenses or lenses adapted to present commercial manufacture.

The light-source is indicated at "1".

The first or primary group of lenses is indicated at "2".

The objective or secondary group of lenses is indicated at "3".

The film or other image area is indicated at "4".

The cylindrical component of the objective, if any, is indicated at "5".

The diaphragm or limiting aperture is indicated at "6".

The objective diaphragm, where used, is indicated at "6'".

The first image of the source is indicated at "7".

The final functioning image is indicated at "8".

And a final virtual image is indicated at "8'".

Such other reference-numerals as may be common to two or more figures will be hereinafter more specifically pointed out.

The light in all cases is assumed to pass from left to right.

Figure 1:
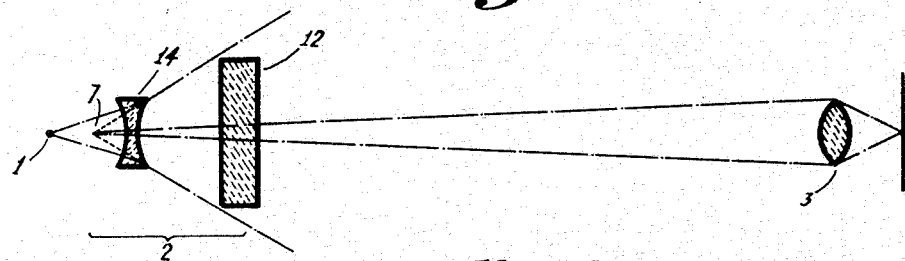
Figure 1 is a vertical section of a preferred form of the invention.
Figure 2:
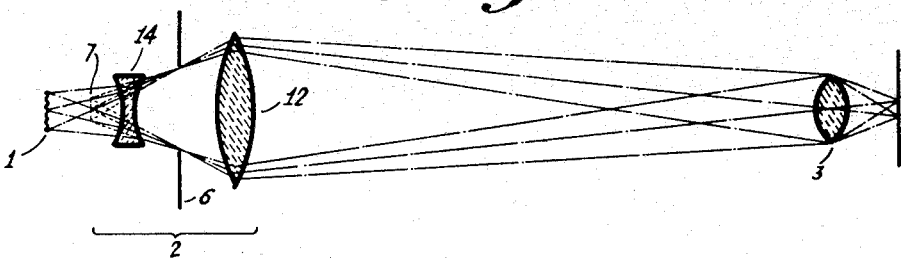
Figure 2 is a horizontal section corresponding to Figure 1.
Figure 3:
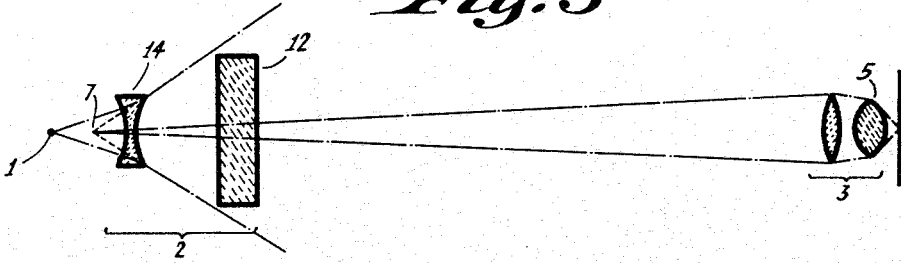
Figure 3 is a vertical section of a modification of Figure 1 employing an objective having a cylindrical component.
Figure 4:
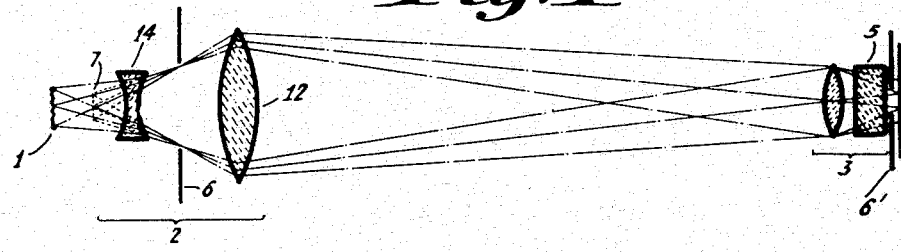
Figure 4 is a horizontal section corresponding to Figure 3.

In the form of the invention shown in Figures 1, 2, and the modifications thereof in Figures 3 and 4:

The primary group 2 is composed of two lenses, a negative spherical lens 14 and a cylindrical lens 12. The spherical lens is of such power, as shown in Figure 2, that it alone would form a virtual image of the source 1 at 7.

In this as well as in all the following modifications, the source 1 is preferably in the form of a high-intensity lamp filament of the helical type, but it may obviously be of any other appropriate type, such as a small arc-lamp, a linear filament, a Nernst glower, etc.; or it may be a secondary source such as an illuminated aperture, or the reflector of a galvanometer or the equivalent as used in sound-recording apparatus or oscillographs. The objective 3 is shown as a double-convex spherical lens, but ordinarily would be of more complicated form, i. e., a microscope objective or the equivalent would be used. The cylindrical objective shown in Figures 3 and 4 may be constructed as shown, from a positive spherical lens and a positive cylindrical lens 5 of shorter focal length or it may be composed of a microscope objective provided with a cylindrical component, or it may be constructed as shown in my application Serial No. 523,284, filed March 17, 1931, which is not material to the combination of the present application.

The negative spherical lens 14 (or, in Figs. 5 to 8, 14') is of such focal length that it forms an image of the source at 7, and this image is smaller in its vertical dimension than the source in the same ratio as the distances of the source and the image from the principal planes of the lens combination. The lateral effective extent of this image, and thereby the length of the final image 8, is defined by the diaphragm 6.

The positive cylindrical lens 12 (or, in Figs. 5 to 8, 12') condenses the light from this image upon the entrance pupil of the objective 3, constituting the second component, without materially affecting the width of the linear image as determined by the negative lens 14 or 14' and the component 3.

The objective 3 is so positioned that it focuses an image of the line 7 upon the film or other image area 4 at 8.

Figure 5:
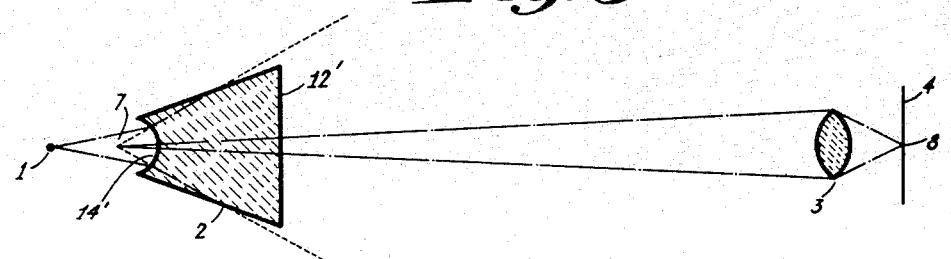
Figure 5 is a vertical section of a second form of the invention.
Figure 6:
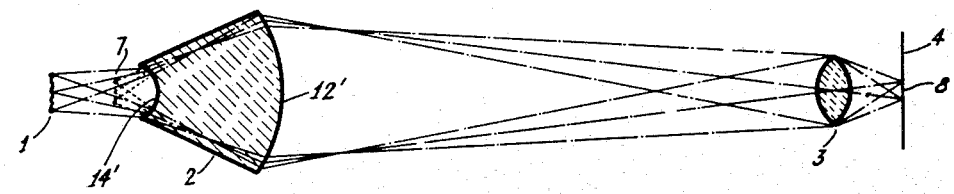
Figure 6 is a horizontal section corresponding to Figure 5.
Figure 7:
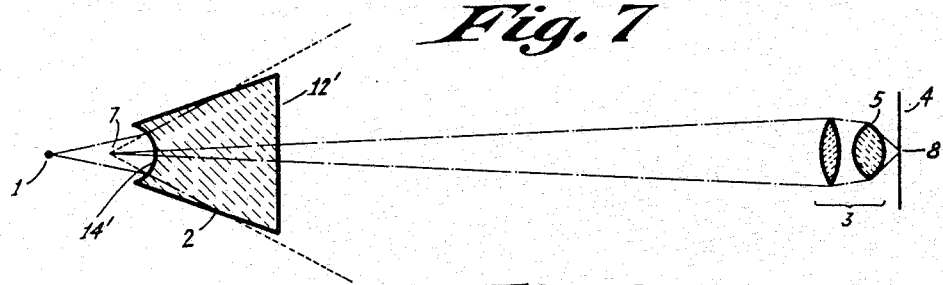
Figure 7 is a vertical section of a modification of Figure 5 employing an objective having a cylindrical component.
Figure 8:
Figure 8 is a horizontal section corresponding to Figure 7.

The form of the invention shown in Figures 5 and 6, and the modification thereof shown in Figures 7 and 8 corresponds to the preceding forms but a sphero-cylindrical lens is used as group 2 instead of a combination of lenses.

This sphero-cylindrical lens can be considered as the spherical lens 14 and the cylindrical lens 12 of Figures 1 to 4 ground on a single piece of glass, the focal lengths being so chosen that the operation remains as described above.

It will be understood that in this specification, the terms "horizontal" and "vertical" have not been used in any absolute sense of the term but merely as indicating relative position or direction, and that choice between these terms has been determined merely by convenience in illustration.

I claim:

1. A linear-image-forming optical system comprising a plurality of lens components, one of said lens components being so located in relation to a light source as to form a virtual linear image of said light source and including a negative spherical lens of short focal length and a positive cylindrical lens of longer focal length, and the other of said lens components being of positive power and located with said linear image at a focus thereof, whereby it will form an image of said virtual image on an image area at the other of its conjugate foci.

2. A linear-image-forming optical system comprising a plurality of lens components, one of said lens components including a negative lens of short focal length and a positive cylindrical lens of longer focal length imaging the image of a light source formed by said negative lens upon the entrance pupil of the other lens component, and the other of said lens components being of positive power and so located in relation to said light source at one of its foci as to form an image of said image on an image area at the other of its conjugate foci.

3. A linear-image-forming optical system comprising a plurality of lens components, one of said lens components being so located in relation to a light source as to form a virtual linear image of said light source and including a negative lens of short focal length and a positive cylindrical lens of longer focal length with its axis perpendicular to the plane defined by the linear image and the axis of the system, and the other of said lens components having a positive cylindrical power about an axis in said plane and being located with said linear image at a focus thereof, whereby it will form an image of said virtual linear image on an image area at the other of its conjugate foci.

JOHN A. MAURER, Jr.